United States Patent
Ogawa et al.

(10) Patent No.: US 9,329,590 B2
(45) Date of Patent: May 3, 2016

(54) MACHINE TOOL

(71) Applicant: FUJI MACHINE MFG. CO., LTD., Chiryu-shi, Aichi (JP)

(72) Inventors: Masashi Ogawa, Toyota (JP); Kazuya Furukawa, Chiryu (JP); Shigefumi Suzuyama, Toyota (JP); Atsushi Kamiya, Toyota (JP)

(73) Assignee: FUJI MACHINE MFG. CO., LTD., Chiryu-shi (JP)

( * ) Notice: Subject to any disclaimer, the term of this patent is extended or adjusted under 35 U.S.C. 154(b) by 422 days.

(21) Appl. No.: 13/856,772

(22) Filed: Apr. 4, 2013

(65) Prior Publication Data
US 2013/0268108 A1    Oct. 10, 2013

(30) Foreign Application Priority Data
Apr. 9, 2012    (JP) .................................. 2012-088741

(51) Int. Cl.
*G05B 19/4063*    (2006.01)
*G05B 19/4065*    (2006.01)

(52) U.S. Cl.
CPC .. *G05B 19/4065* (2013.01); *G05B 2219/49194* (2013.01)

(58) Field of Classification Search
None
See application file for complete search history.

(56) References Cited

U.S. PATENT DOCUMENTS

| 5,544,046 | A  | * | 8/1996 | Niwa | ............................. | 700/159 |
| 6,456,896 | B1 | * | 9/2002 | Ito et al. | ......................... | 700/193 |
| 6,904,333 | B2 | * | 6/2005 | Morimura | ............... | B29C 45/76 |
|           |    |   |        |          |               | 340/539.11 |
| 2006/0089745 | A1 | * | 4/2006 | Suzuki et al. | .................. | 700/176 |
| 2012/0038763 | A1 | * | 2/2012 | Kawada et al. | .................. | 348/95 |

FOREIGN PATENT DOCUMENTS

JP    A-2004-030421    1/2004

* cited by examiner

*Primary Examiner* — Sean Shechtman
(74) *Attorney, Agent, or Firm* — Oliff PLC

(57) ABSTRACT

A machine tool includes a controller including a storage unit that stores correction history data including correction amounts of the positions of tools input from a worker and time when the correction amounts are input, in association with the tools; and a display device that can display a time-based graph showing a relationship between the time and the correction amount for each tool.

2 Claims, 10 Drawing Sheets

MACHINE TOOL

BACKGROUND OF THE INVENTION

1. Field of the Invention

The present invention relates to a machine tool that machines a workpiece using tools.

2. Background Art

As the number of machined workpieces is increasing, a cutting edge of a tool is worn out. That is, the position of the cutting edge of the tool is displaced due to wear. For this reason, the position of the cutting edge of the tool (the machining point of the tool relative to the workpiece) needs to be corrected according to the amount of wear. Further, a tool, which is significantly worn out, needs to be replaced with a new tool.

In this respect, JP-A-2004-30421 discloses an NC machine tool that can display the change of a correction amount of the position of a cutting edge as a graph. According to the NC machine tool disclosed in JP-A-2004-30421, a worker can visually recognize the change of a correction amount of the portion of the cutting edge relative to the number of workpieces that are machined after the replacement of a tool or time that has elapsed from the start of operation. For this reason, a worker can determine a correction amount to be input while viewing graphs (viewing the past correction history).

Incidentally, the position of the cutting edge of the tool is displaced due to heat in addition to the wear of the above-mentioned cutting edge. Specifically, a workpiece is mounted on a headstock by a chuck. Meanwhile, the tool is mounted on a tool rest. The headstock and the tool rest generate heat with the operation of the machine tool. For this reason, a relative positional relationship between the workpiece and the cutting edge of the tool is changed. That is, the position of the cutting edge of the tool is displaced.

Further, the ambient temperature in a factory is changed due to the outdoor temperature, the number of people in the factory, the driving heat of machines disposed in the factory, and the like. The relative positional relationship between the workpiece and the cutting edge of the tool is changed even due to the change of the ambient temperature. For this reason, it is necessary to consider the influence of heat when correcting the position of the cutting edge of the tool.

However, in the case of the NC machine tool disclosed in JP-A-2004-30421, it has been difficult to grasp the influence of heat on the position of the cutting edge of the tool from the graph to be displayed. For this reason, it has been difficult for a worker to input a correction amount in consideration of the influence of heat.

SUMMARY OF THE INVENTION

Accordingly, an object of the invention is to provide a machine tool that can display a graph from which the change of a correction amount caused by the influence of heat is easily grasped.

(1) In order to achieve the above-mentioned object, according to an aspect of the invention, there is provided a machine tool that includes a controller and a display device. The controller includes a storage unit that stores correction history data including correction amounts of the positions of tools input from a worker and the time when the correction amounts are input, in association with the tools. The display device may display a time-based graph showing a relationship between the time and the correction amount for each tool.

According to the machine tool of the aspect of the invention, it is possible to display the change of a correction amount as a graph in association with not elapsed time but time. For this reason, a worker (who includes an administrator managing the work) easily grasps the change of a correction amount that is caused by the influence of heat.

Further, according to the machine tool of the aspect of the invention, a worker can confirm correction amounts, which are input in the past by a worker, by viewing the time-based graph. For this reason, a worker can inspect whether or not the correction amount input by a worker is adequate afterward.

Furthermore, according to the machine tool of the aspect of the invention, a worker easily determines the patterns of the change of a correction amount corresponding to the operation hours, the on-duty hours, season, and the like by analyzing the correction history of the past. For this reason, a worker easily determines an adequate correction amount regardless of the level of skill of a worker.

Moreover, as described above, the relative positional relationship between the workpiece and the cutting edge of the tool, that is, the position of the cutting edge of the tool is displaced due to the heat generated by the headstock and the tool rest. In particular, the temperatures of the tool rest and the headstock tend to be lowered after the machine tool stops for a long time, such as at the time of the start of work, after a meal, a recess, and the like. For this reason, a worker needs to input a large correction amount. In this respect, according to the machine tool of the aspect of the invention, it is possible to display the change of a correction amount as a graph in association with time. For this reason, a worker can input a correction amount with reference to the latest correction amounts that has been inputted in the past (for example, at the same time yesterday). Accordingly, a worker easily determines an adequate correction amount regardless of the level of skill of a worker.

(1-1) Preferably, in the structure of (1), the controller may include a calculation unit regulating the deletion or update of a correction amount of the correction amount that is stored in the storage unit once. According to this structure, when a worker incorrectly inputs a correction amount, it is possible to regulate the deletion of the input history of the correction amount. For this reason, when the occurrence of defective products is caused by the incorrect input of a correction amount, it is easy to investigate the cause of the occurrence of defective products.

(1-2) Preferably, in the structure of (1), the machine tool may further include a selection portion on which a correction number associated with the correction history data is selected by a worker, and the storage unit may store only the correction history data associated with the selected correction number.

According to this structure, it is possible to save the memory of the storage unit as compared to a case where correction history data corresponding to all tools are stored in the storage unit.

(2) Preferably, in the structure of (1), the correction history data may include the number of machined workpieces at the time of the input of the correction amount, and the display device may switch and display the time-based graph and a machining-based graph showing a relationship between the number of machined workpieces and the correction amount for each tool.

According to this structure, it is possible to select the time-based graph in order to see change of a correction amount corresponding to thermal displacement, and to select the machining-based graph in order to see the change of a correction amount corresponding to the wear of the tools.

(3) Preferably, in the structure of (2), when a direction where a spindle extends is defined as a spindle direction and a direction orthogonal to the spindle direction is defined as an orthogonal direction, the display device may display and switch the time-based graph and the machining-based graph for each of the spindle direction and the orthogonal direction. According to this structure, it is possible to manage a correction amount for each of the spindle direction and the orthogonal direction.

(4) Preferably, in the structure of any one of (1) to (3), the display device may display and switch a graph display mode screen that may display the time-based graph for each tool and a data display mode screen that displays the correction history data for each tool.

According to this structure, it is possible to switch the graph display mode screen (the time-based graph is displayed in the case of the structure of (1) and the time-based graph or the machining-based graph is displayed in the cases of the structures of (2) and (3)) and the data display mode screen. For this reason, it is possible to visually recognize not only the change of a correction amount but also a specific correction amount (an input value).

According to the aspect of the invention, it is possible to provide a machine tool that can display a graph from which the change of a correction amount caused by the influence of heat is easily grasped.

DETAILED DESCRIPTION OF THE INVENTION

An embodiment where a machine tool of the invention is embodied as a CNC lathe will be described below.

Structure of CNC Lathe

Figure 1:
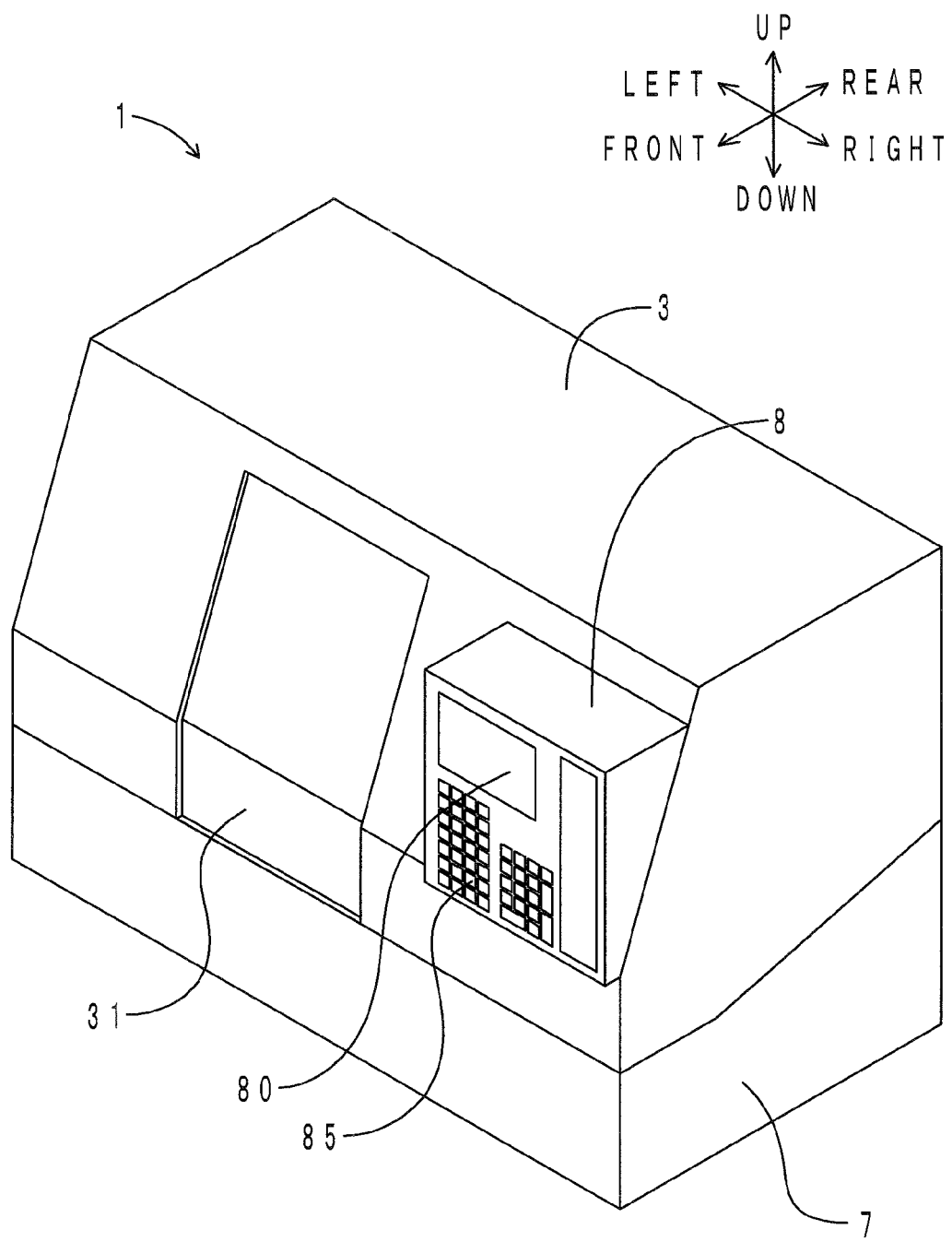
FIG. 1 is a perspective view of the appearance of a CNC lathe that is an embodiment of the invention.
Figure 2:
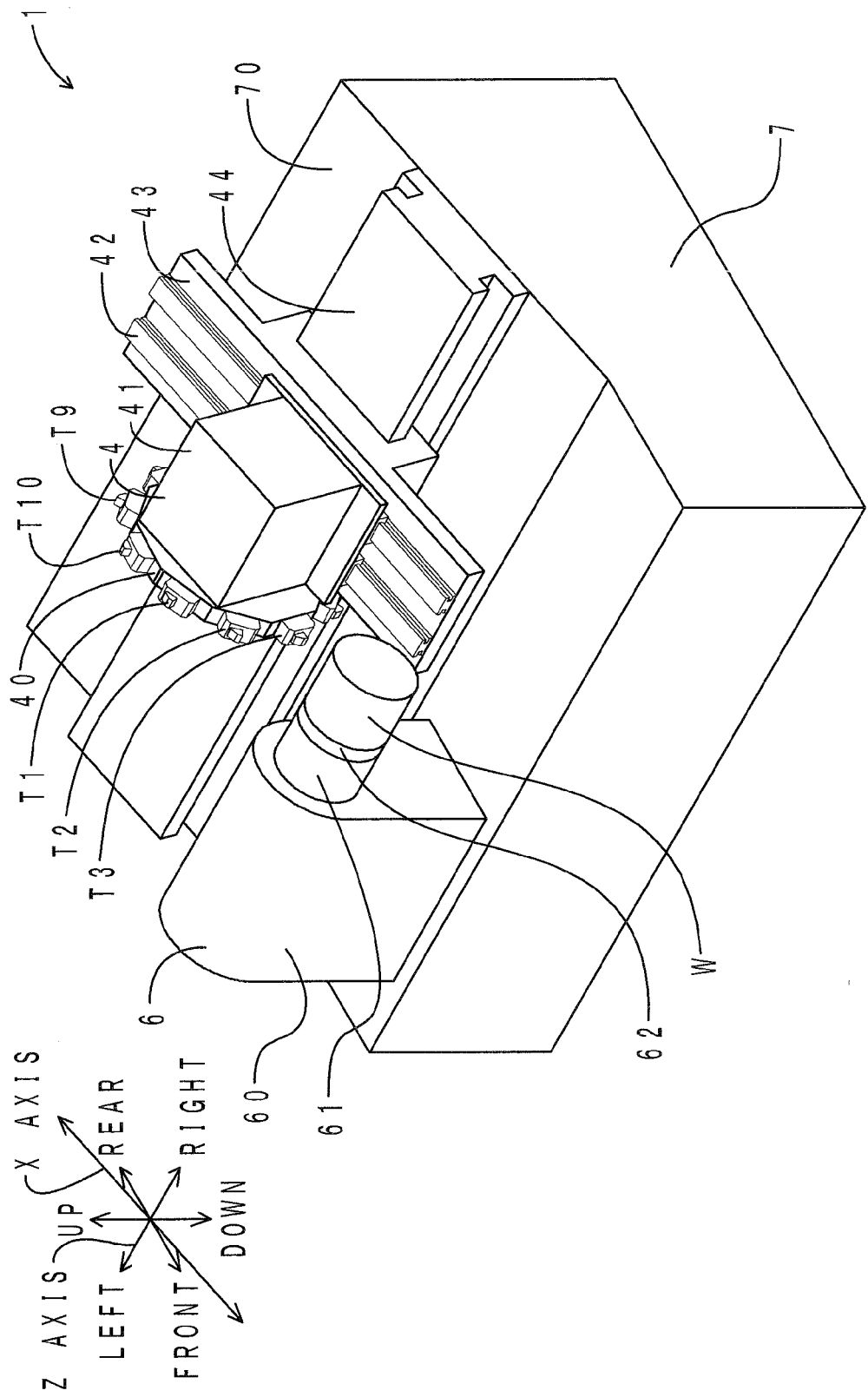
FIG. 2 is a perspective view of the internal structure of the CNC lathe.

First, the structure of a CNC lathe of this embodiment will be described. FIG. 1 is a perspective view of the appearance of the CNC lathe of this embodiment. FIG. 2 is a perspective view of the internal structure of the CNC lathe. As shown in FIGS. 1 and 2, the CNC lathe 1 includes a controller, a whole cover 3, a tool rest 4, a headstock 6, a bed 7, and a display device 8. Meanwhile, a "spindle direction" of the invention corresponds to a left and right direction in the drawings (the Z-axis direction in FIG. 2). Further, an "orthogonal direction" of the invention corresponds to a front lower-rear upper direction in the drawings (the Z-axis direction in FIG. 2).

Whole Cover 3 and Display Device 8

As shown in FIG. 1, the whole cover 3 forms an outer shell of the CNC lathe 1. The whole cover 3 includes an automatic door 31 on the front thereof. The display device 8 is provided on the front of the whole cover 3. The display device 8 includes a screen 80 and a plurality of input buttons 85. The screen 80 is a touch panel. The screen 80 can be switched to a maintenance screen, a graph display mode screen, a data display mode screen, and a setting screen. The screen 80 will be described in detail below. The plurality of input buttons 85 is disposed below the screen 80. Numerals, signs, and letters (alphabets and the like) are assigned to the plurality of input buttons 85.

Bed 7 and Headstock 6

As shown in FIG. 2, the bed 7 is disposed on the floor of a factory. An inclined portion 70 is formed at the rear portion of the upper surface of the bed 7. The inclined portion 70 is formed in the shape of a slope that descends toward the front side from the rear side.

The headstock 6 is disposed on the left portion of the upper surface of the bed 7. The headstock 6 includes a main body 60, a spindle 61, and a chuck 62. The main body 60 is disposed on the upper surface of the bed 7. The spindle 61 protrudes from the right surface of the main body 60 to the right side. The spindle 61 extends in the left and right direction. The spindle 61 can rotate about its own axis. The chuck 62 is disposed at the right end of the spindle 61. A workpiece W is detachably fixed to the chuck 62.

Tool Rest 4

Figure 3:
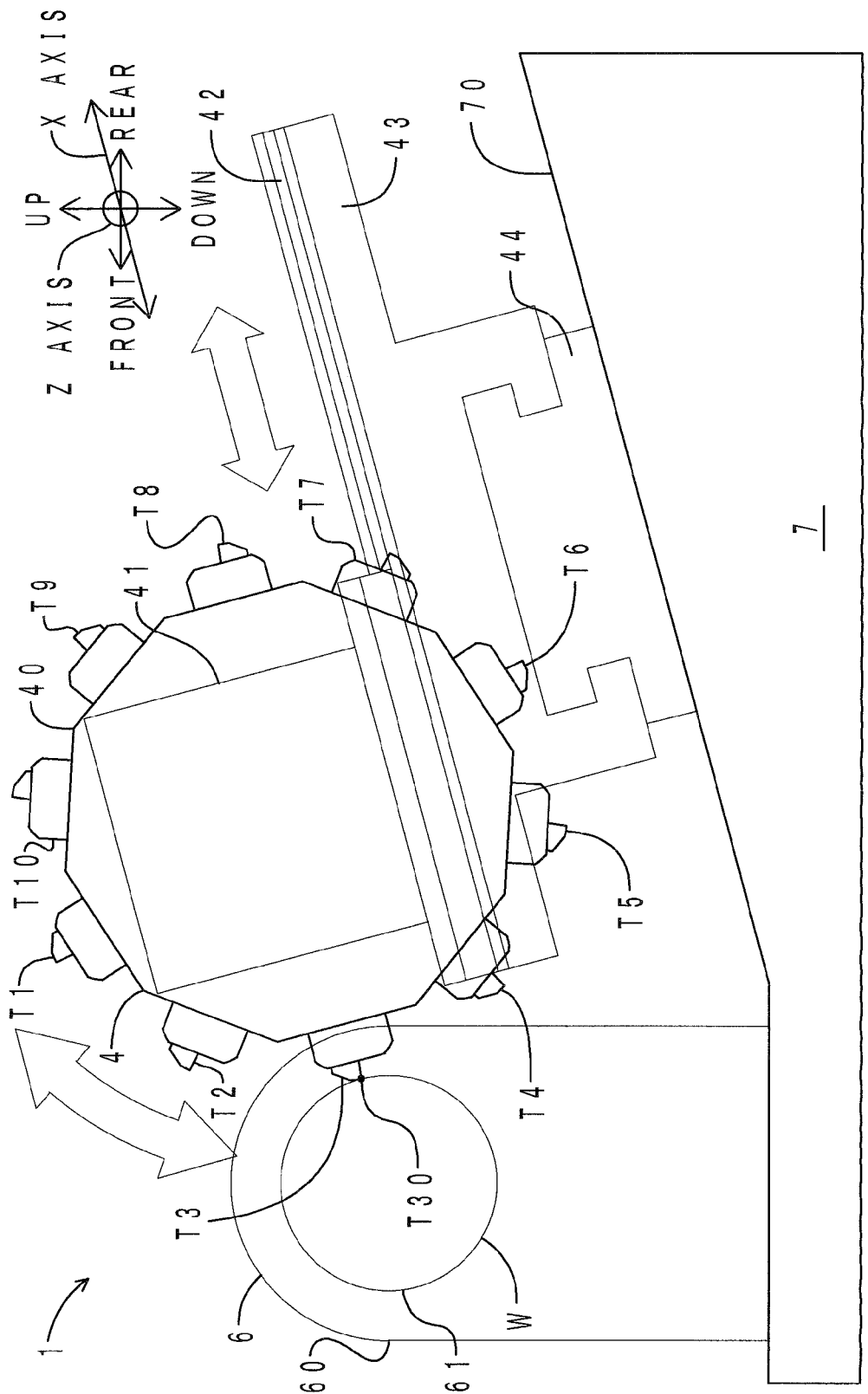
FIG. 3 is a perspective enlarged right side view in FIG. 2.

FIG. 3 is a perspective enlarged right side view in FIG. 2. As shown in FIGS. 2 and 3, the tool rest 4 includes a tool magazine 40, a turret unit 41, an X-axis lower slide 42, a Z-axis slide 43, and a Z-axis lower slide 44.

The Z-axis lower slide 44 is disposed on the inclined portion 70 that is formed on the upper surface of the bed 7. The Z-axis slide 43 can move relative to the Z-axis lower slide 44 in the left and right direction (the direction of the central axis of the spindle 61). The X-axis lower slide 42 is disposed on the upper surface of the Z-axis slide 43. The turret unit 41 is an angle indexing unit. The turret unit 41 can move relative to the X-axis lower slide 42 in the front lower-rear upper direction (a direction where the turret unit approaches and is separated from the central axis of the spindle 61). The tool magazine 40 is disposed on the left surface of the turret unit 41. A total of ten holders (not shown) are disposed on the tool magazine 40 at an interval of 36°. The tool magazine 40 can be rotated for each holder at an interval of 36° by the turret unit 41. Ten tools T1 to T10 are assigned to the ten holders of the tool magazine 40.

When the spindle 61 rotates, a cutting edge T30 of the tool T3 comes into sliding contact with the outer peripheral surface of the workpiece W as shown in FIG. 3. The tool T3 cuts the outer peripheral surface of the workpiece W by the sliding contact. The position of the cutting edge T30 corresponds to the machining point of the tool T3 on the workpiece W.

Controller

Figure 4:
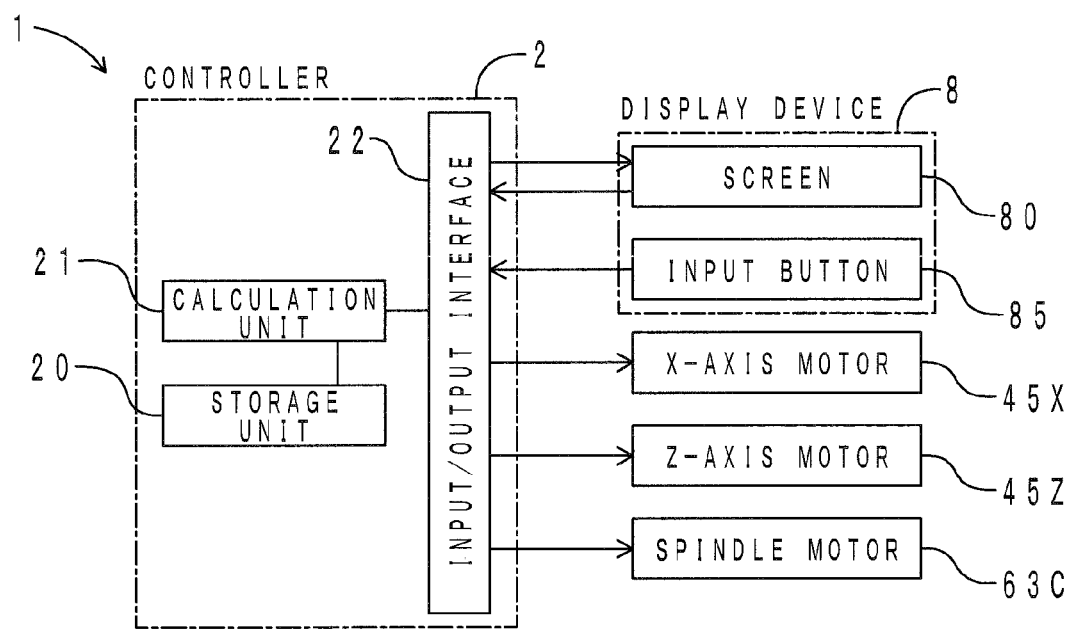
FIG. 4 is a block diagram of the CNC lathe.

FIG. 4 is a block diagram of the CNC lathe of this embodiment. The controller 2 includes a storage unit 20, a calculation unit 21, and an input/output interface 22. The controller 2 is electrically connected to the screen 80, the plurality of input buttons 85, an X-axis motor 45X, a Z-axis motor 45Z, and a spindle motor 63C. The X-axis motor 45X can drive the turret unit 41 in the front lower-rear upper direction (a direction where the turret unit approaches and is separated from the central axis of the spindle 61). The Z-axis motor 45Z can drive the Z-axis slide 43 in the left and right direction (the direction of the central axis of the spindle 61). The spindle motor 630 can drive the spindle 61 so that the spindle 61 rotates about its own axis.

Screen 80

Figure 5:
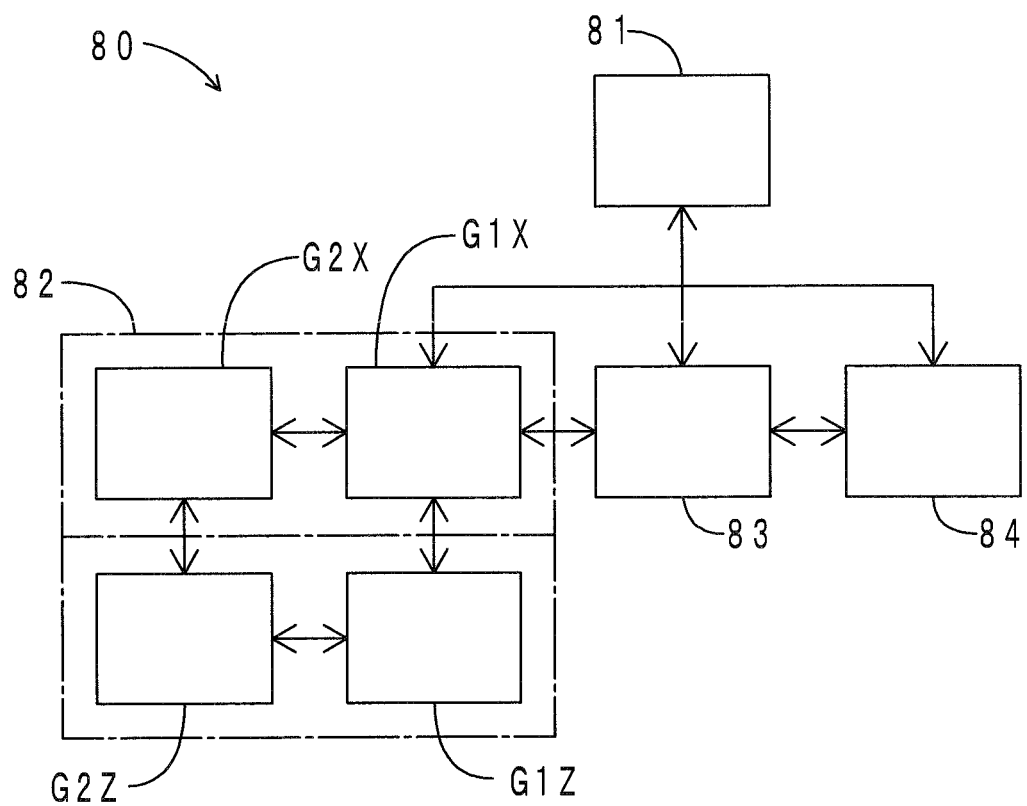
FIG. 5 is a hierarchy diagram of the screen of the CNC lathe.

Next, the screen 80 of the CNC lathe of this embodiment will be described in detail. FIG. 5 is a hierarchy diagram of the screen of the CNC lathe of this embodiment. As shown in FIG. 5, the screen 80 can be switched to a maintenance screen 81, a graph display mode screen 82, a data display mode screen 83, and a setting screen 84.

Maintenance Screen 81

Figure 6:
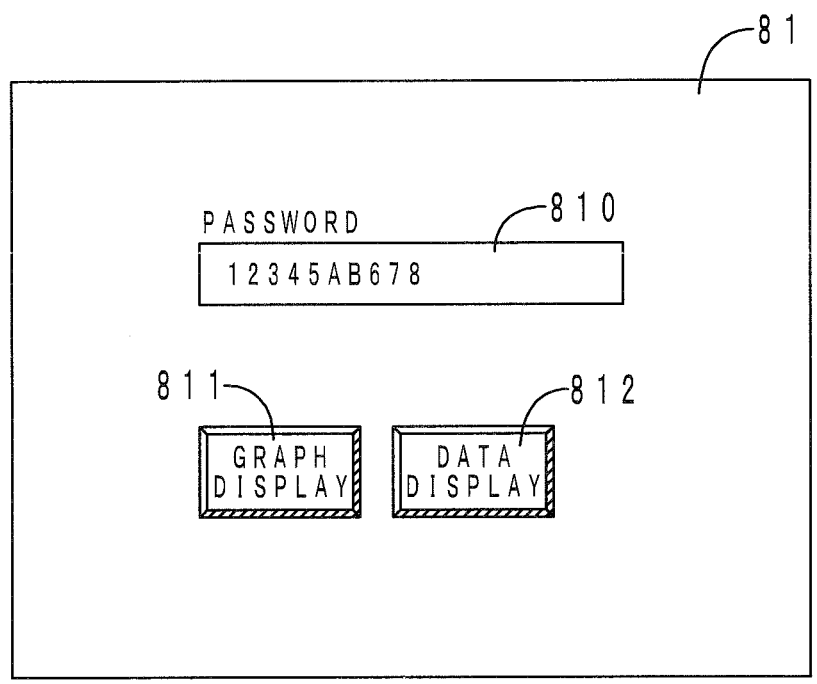
FIG. 6 is a schematic diagram of a maintenance screen.

FIG. 6 is a schematic diagram of the maintenance screen. As shown in FIG. 6, a password display portion 810, a graph display mode screen-switching button 811, and a data display mode screen-switching button 812 are disposed on the maintenance screen 81.

A password ("1234AB678" in this embodiment) is displayed in the password display portion 810. The graph display mode screen-switching button 811 is used to switch the maintenance screen 81 to the graph display mode screen 82. The data display mode screen-switching button 812 is used to switch the maintenance screen 81 to the data display mode screen 83.

Data Display Mode Screen 83

Figure 7:
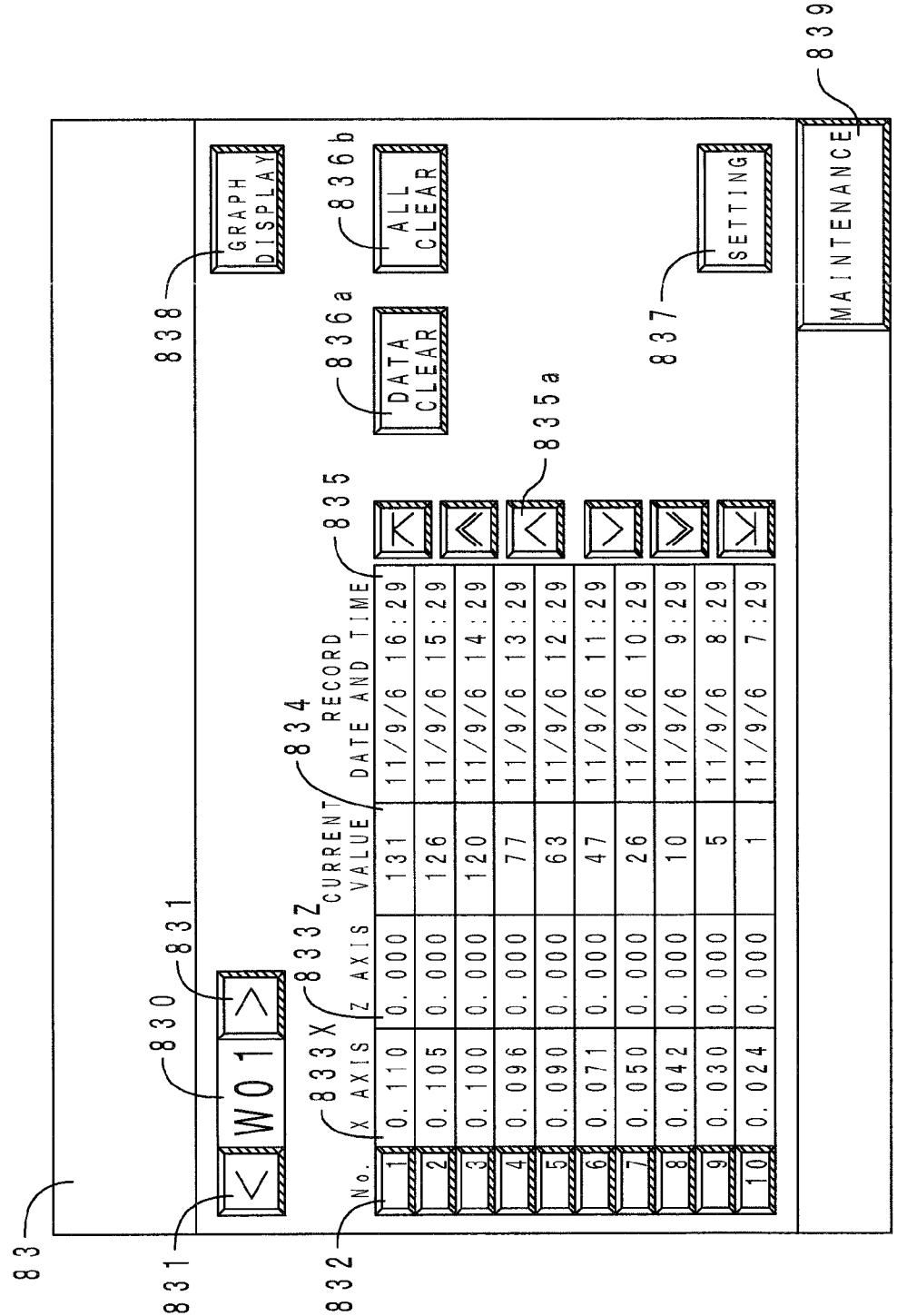
FIG. 7 is a schematic diagram of a data display mode screen.

FIG. 7 is a schematic diagram of the data display mode screen. A correction number display portion 830, a pair of correction number selection buttons 831, ten correction history selection buttons 832, ten X-axis correction amount display portions 833X, ten Z-axis correction amount display portions 833Z, ten current value display portions 834, ten record date-and-time display portions 835, six stage feed buttons 835a, an individual-data deletion button 836a, an all-data deletion button 836b, a setting screen-switching button 837, a graph display mode screen-switching button 838, and a maintenance screen-switching button 839 are disposed on the data display mode screen 83.

The respective data of the correction number display portion 830, the X-axis correction amount display portions 833X, the Z-axis correction amount display portions 833Z, the current value display portions 834, and the record date-and-time display portion 835 correspond to "correction history data" of the invention.

A correction number ("W01" in this embodiment) is displayed in the correction number display portion 830. Correction numbers are assigned to the respective tools T1 to T10. That is, a total of ten correction numbers are set. The pair of correction number selection buttons 831 are used to send the correction number, which is displayed in the correction number display portion 830, in the forward direction (the direction of "W01→W02→W03") or the reverse direction (the direction of "W01→W10→W09").

The ten correction history selection buttons 832 are lined up in a vertical direction. The X-axis correction amount display portion 833X, the Z-axis correction amount display portion 833Z, the current value display portion 834, and the record date-and-time display portion 835 are lined up in a horizontal direction of each correction history selection button 832. That is, data groups are displayed on ten horizontal lines. Among the data groups on the ten horizontal lines, data displayed on the uppermost horizontal line are data at the time of the latest correction amount input.

The numerical value of a correction amount of the X-axis correction amount display portion 833X and the numerical value of a correction amount of the Z-axis correction amount display portion 833Z are displayed as "negative values" when the cutting edge T30 of the tool T3 is shifted from a reference position "0" in a direction where the cutting edge T30 is separated from the workpiece W as shown in FIG. 3. On the contrary, the numerical value of a correction amount of the X-axis correction amount display portion 833X and the numerical value of a correction amount of the Z-axis correction amount display portion 833Z are displayed as "positive values" when the cutting edge T30 of the tool T3 is shifted from the reference position "0" in a direction where the cutting edge T30 approaches the workpiece W.

For example, the X-axis correction amount display portion 833X ("0.110" in this embodiment), the Z-axis correction amount display portion 833Z ("0.000" in this embodiment), the current value display portion 834 ("131" in this embodiment), and the record date-and-time display portion 835 ("11/9/6 16:29" in this embodiment) are displayed on the side of the correction history selection button 832 of the uppermost horizontal line ("1" in this embodiment).

The numerical value "0.110" of the X-axis correction amount display portion 833X means that a cumulative correction amount in the X-axis direction (that is not a relative correction amount with respect to a previous correction amount and is an absolute correction amount with respect to the reference position "0") is 0.110 mm. The numerical value "0.000" of the Z-axis correction amount display portion 833Z means that a cumulative correction amount in the Z-axis direction is 0.000 mm. The numerical value "131" of the current value display portion 834 means that the number of workpieces W machined immediately after a correction amount is input is 131. The numerical value "11/9/6 16:29" of the record date-and-time display portion 835 means that the time when a correction amount is input is 04:29 p.m. on Sep. 6, 2011. As described above, it is possible to visually recognize a cumulative correction amount in the X-axis direction, a cumulative correction amount in the Z-axis direction, the number of machined workpieces, and time, when a correction amount is input, from the respective numerical values that are lined up on the horizontal line.

The six stage feed buttons 835a are used to send the data groups, which are displayed on the ten horizontal lines, to the upper side (the side where new input is present) and the lower side (the side where old input is present). That is, it is possible to collectively display the correction history, which corresponds to a desired period, on the data display mode screen 83 in groups of 10.

The individual-data deletion button 836a is used to delete the data that are displayed on each horizontal line. The all-data deletion button 836b is used to delete the data, which are displayed on the plurality of horizontal lines, at one time. However, the individual-data deletion button 836a and the all-data deletion button 836b are displayed only when a password is input to the password display portion 810 of the maintenance screen 81 shown in FIG. 6. Conversely, if the password is not input to the password display portion 810, the individual-data deletion button 836a and the all-data deletion button 836b are not displayed. This will be described in detail below.

The graph display mode screen-switching button 838 is used to switch the data display mode screen 83 to the graph display mode screen 82. The maintenance screen-switching button 839 is used to switch the data display mode screen 83 to the maintenance screen 81. The setting screen-switching button 837 is used to switch the data display mode screen 83 to the setting screen 84.

Graph Display Mode Screen 82

As shown in FIG. 5, a machining-based graph G1X corresponding to an X axis, a time-based graph G2X corresponding to an X axis, a machining-based graph G1Z corresponding to a Z axis, and a time-based graph G2Z corresponding to a Z axis can be switched and displayed on the graph display mode screen 82.

Figure 8:
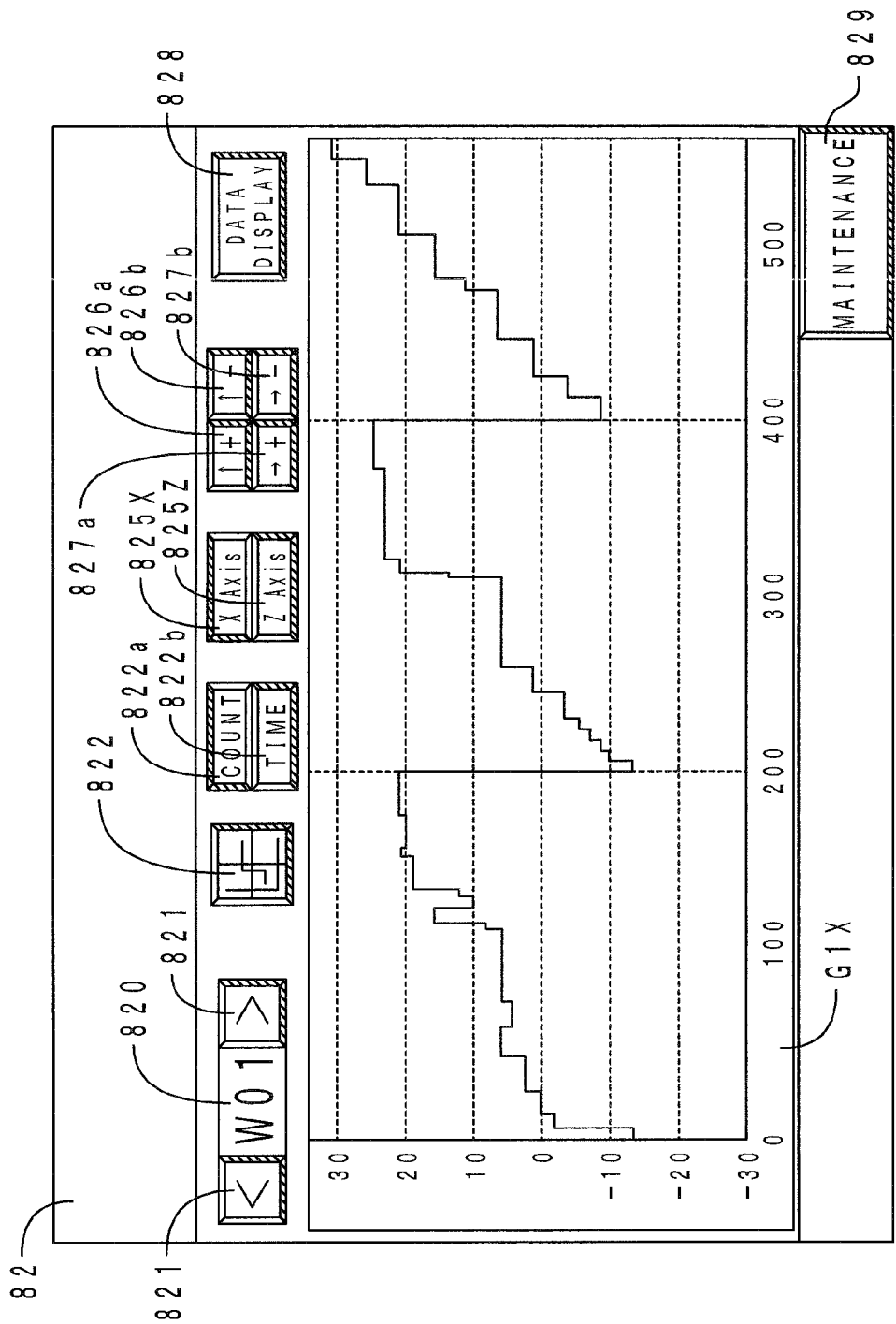
FIG. 8 is a schematic diagram of a graph display mode screen on which a machining-based graph corresponding to an X axis is displayed.

FIG. 8 is a schematic diagram of the graph display mode screen on which the machining-based graph corresponding to an X axis is displayed. The machining-based graph G1X corresponding to an X axis, a correction number display portion 820, a pair of correction number selection buttons 821, a default button 822, a machining-based graph selection button 822a, a time-based graph selection button 822b, an X-axis selection button 825X, a Z-axis selection button 825Z, a vertical axis zoom-in button 826a, a vertical axis zoom-out button 826b, a horizontal axis zoom-in button 827a, a horizontal axis zoom-out button 827b, a data display mode screen-switching button 828, and a maintenance screen-switching button 829 are displayed on the graph display mode screen 82.

A horizontal axis of the machining-based graph G1X corresponding to an X axis represents the number of machined workpieces. That is, the horizontal axis represents the cumulative number of workpieces W that have been subjected to machining. The horizontal axis corresponds to the numerical value of the current value display portion 834 of FIG. 7. Meanwhile, a vertical axis of the machining-based graph G1X represents a correction amount (μm) in the X-axis direction that is input by a worker (who includes an administrator managing a work). The vertical axis corresponds to the numerical value of the X-axis correction amount display portion 833X of FIG. 7. As shown in the machining-based graph G1X, a correction amount is changed in the form of a step (polyline).

A correction number ("W01" in this embodiment) is displayed in the correction number display portion 820. The correction number of the correction number display portion 820 corresponds to the correction number of the correction number display portion 830 of FIG. 7. The pair of correction number selection buttons 821 are used to send the correction number, which is displayed in the correction number display portion 820, in the forward direction (the direction of "W01→W02→W03") or in the reverse direction (the direction of "W01→W10→W09").

The vertical axis zoom-in button 826a is used to zoom in the machining-based graph G1X in the vertical direction. The vertical axis zoom-out button 826b is used to zoom out the machining-based graph G1X in the vertical direction. The horizontal axis zoom-in button 827a is used to zoom in the machining-based graph G1X in the horizontal direction. The horizontal axis zoom-out button 827b is used to zoom out the machining-based graph G1X in the horizontal direction. As described above, the machining-based graph G1X can be zoomed in and out in the vertical and horizontal directions.

Further, it is possible to zoom in the machining-based graph G1X by directly expanding the machining-based graph G1X itself of the graph display mode screen 82 with fingers. On the contrary, it is possible to zoom out the machining-based graph G1X by directly pinching the machining-based graph G1X itself of the graph display mode screen 82 with fingers.

Further, it is possible to shift the machining-based graph G1X in the horizontal direction by directly tracing the machining-based graph G1X itself of the graph display mode screen 82 with a finger. For example, it is possible to display the machining-based graph G1X where the number of machined workpieces is in the range of 600 to 1000.

The default button 822 is used to return the machining-based graph G1X to the reference position shown in FIG. 8. Further, the default button 822 is used to return the machining-based graph G1X to the reference scale shown in FIG. 8.

The machining-based graph selection button 822a is used to display the machining-based graph G1X. That is, FIG. 8 shows a state where the machining-based graph selection button 822a is pressed. Meanwhile, the time-based graph selection button 822b is used to display a time-based graph G2X to be described below.

The X-axis selection button 825X is used to display the machining-based graph G1X corresponding to an X axis. That is, FIG. 8 shows a state where X-axis selection button 825X is pressed. Meanwhile, the Z-axis selection button 825Z is used to display the machining-based graph G1Z corresponding to a Z axis (see FIG. 5).

The maintenance screen-switching button 829 is used to switch the graph display mode screen 82 to the maintenance screen 81. The data display mode screen-switching button 828 is used to switch the graph display mode screen 82 to the data display mode screen 83.

Figure 9:
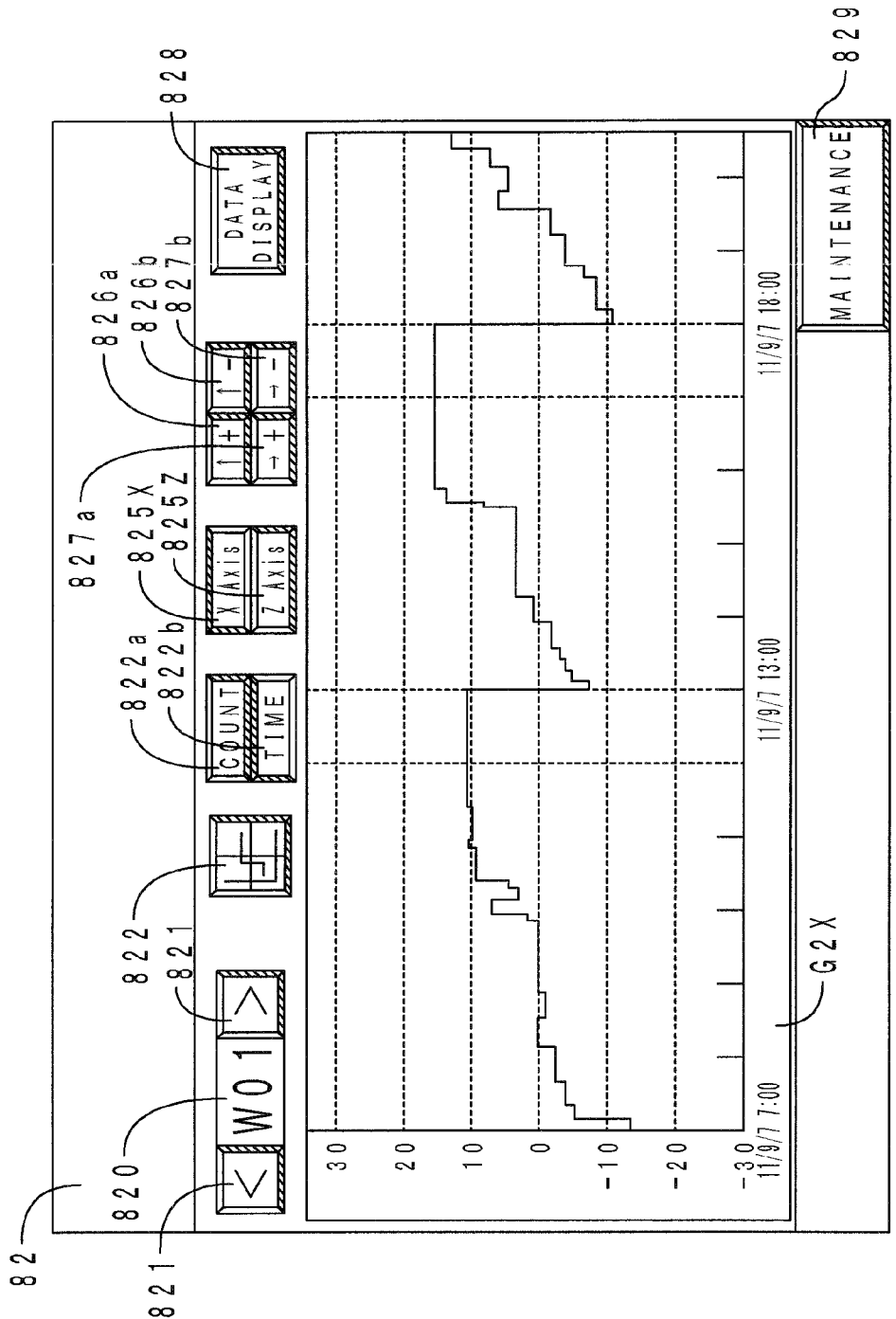
FIG. 9 is a schematic diagram of a graph display mode screen on which a time-based graph corresponding to an X axis is displayed.

FIG. 9 is a schematic diagram of a graph display mode screen on which the time-based graph corresponding to an X axis is displayed. The graph display mode screen of FIG. 9 is different from the graph display mode screen 82 of FIG. 8 in that the time-based graph G2X corresponding to an X axis is displayed and the time-based graph selection button 822b is pressed.

A horizontal axis of the time-based graph G2X corresponding to an X axis represents time. The horizontal axis corresponds to the numerical values of the record date-and-time display portions 835 of FIG. 7. Meanwhile, a vertical axis of the time-based graph G2X represents a correction amount (μm) in the X-axis direction that is input by a worker. A vertical axis thereof corresponds to the numerical values of the X-axis correction amount display portions 833X of FIG. 7. As shown in the time-based graph G2X, a correction amount is changed in the form of a step (polyline).

Setting Screen 84

Figure 10:
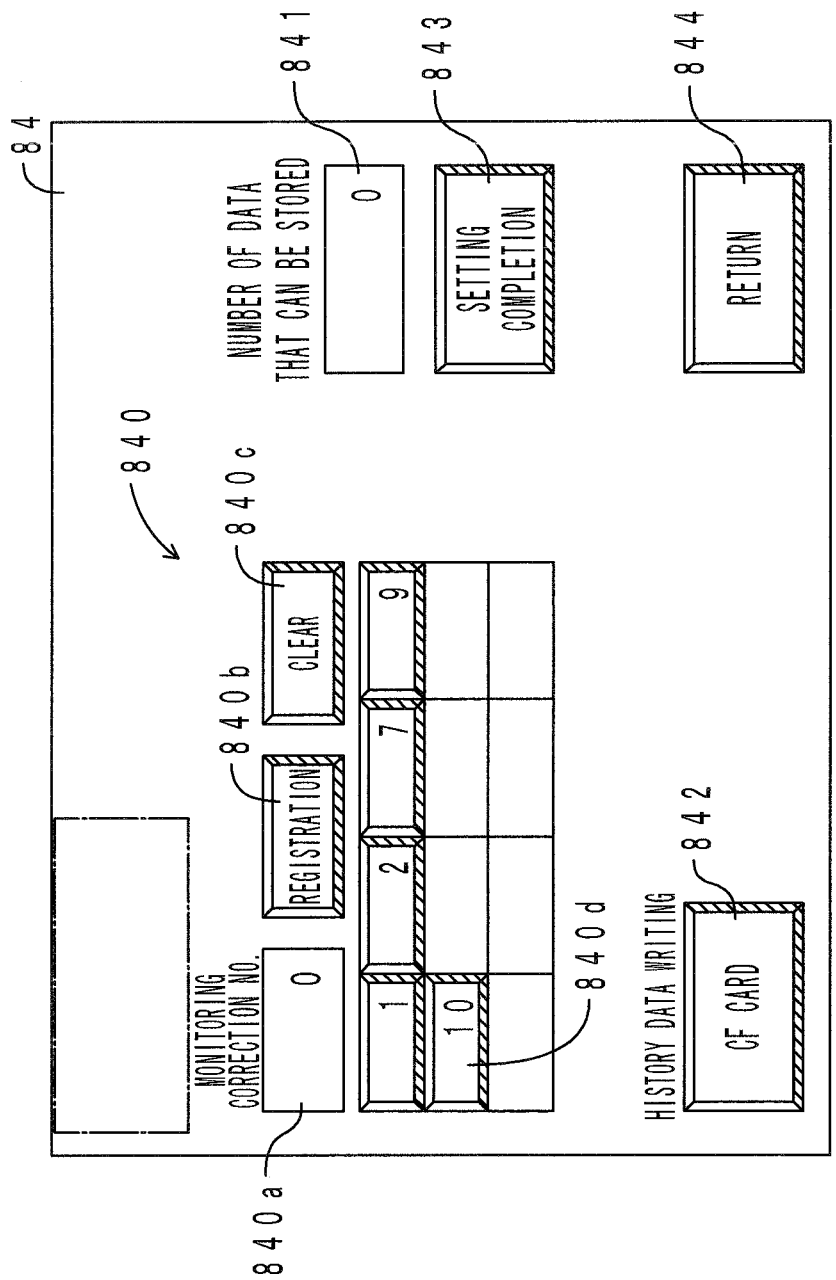
FIG. 10 is a schematic diagram of a setting screen.

FIG. 10 is a schematic diagram of the setting screen. A selection portion 840, a data quantity display portion 841, a data-write button 842, a setting completion button 843, and a return button 844 are disposed on the setting screen 84.

Meanwhile, it is necessary to input a correct password to the password display portion 810 of the maintenance screen 81 shown in FIG. 6 in order to add or delete a correction number that is a monitoring object on the setting screen 84. This will be described in detail below.

A monitoring object candidate display portion 840a, a monitoring object registration button 840b, a monitoring object deletion button 840c, and a plurality of monitoring object selection buttons 840d are disposed on the selection portion 840.

A correction number (that is, a tool) of a monitoring object candidate is displayed in the monitoring object candidate display portion 840a. The monitoring object registration button 840b is used to register the correction number, which is displayed in the monitoring object candidate display portion 840a, in the storage unit 20 of the controller 2. The monitoring object selection button 840d correspond to the registered correction number. The monitoring object selection button 840d is used to exclude the correction number, which corresponds to the monitoring object selection button 840d, from the monitoring object.

The number of data, which can be stored in the storage unit 20 for each correction number as a monitoring object, is displayed in the data quantity display portion 841. When the correction number, which is a monitoring object, is increased, the number of data, which can be stored per unit correction number, is reduced to that extent. On the contrary, when the correction number, which is a monitoring object, is reduced, the number of data, which can be stored per unit correction number, is increased to that extent.

The data-write button 842 is used to write the data of the storage unit 20 on a CF (Compact Flash (registered trademark)) card (not shown). The setting completion button 843 is used to complete the setting of the correction number on the setting screen 84. The return button 844 is used to switch the setting screen 84 to the data display mode screen 83.

Action of CNC lathe at the time of machining on workpiece

Next, the action of the CNC lathe of this embodiment at the time of machining on the workpiece will be briefly described. First, as shown in FIGS. 2 and 3, the workpiece W is fixed to the chuck 62. Then, the controller 2 drives the spindle motor 63C as shown in FIG. 4. When the spindle motor 63C is driven, the spindle 61, that is, the workpiece W provided at the end of the spindle 61 rotates about the axis of the spindle 61. After that, the controller 2 drives the X-axis motor 45X and the Z-axis motor 45Z as shown in FIG. 4. Further, the cutting edge T30 of the tool T3 is moved to a predetermined machining point. The cutting edge T30 comes into sliding contact with the outer peripheral surface of the workpiece W, which is rotating, at the machining point. Cutting is performed on the outer peripheral surface of the workpiece W by the sliding contact. Cutting is performed while the tools T1 to T10 are appropriately switched according to the machining surface of the workpiece W. The workpiece W, which has been subjected to machining, is separated from the chuck 62, and is conveyed to a post-process. Meanwhile, a new workpiece W is fixed to the chuck 62 that is empty. In this way, cutting is successively performed on the same kind of plural workpieces W in the CNC lathe 1.

Timing of Input of Correction Amount of Position of Cutting Edge of Tool

Next, the timing of the input of a correction amount of the position of the cutting edge of the tool will be described. The input of a correction amount is performed after the replacement of the tool. That is, the tool T3, which has been significantly worn out, is replaced with a new tool T3 at a predetermined timing (in this embodiment, whenever the number of machined workpieces W is 200). In this case, the position of the cutting edge T30 of the tool T3 is significantly changed. For this reason, the position of the cutting edge T30 needs to be significantly corrected.

Further, the input of a correction amount is performed after the machine tool stops for a long time. That is, after the machine tool stops for a long time (in this embodiment, at 7 a.m. (after the start of work), at 1 p.m. (after a meal and a recess), and at 6 p.m. (after a recess), the temperatures of the tool rest 4 and the headstock 6 are apt to be lowered. For this reason, the position of the cutting edge T30 of the tool T3 is significantly changed. Accordingly, the position of the cutting edge T30 needs to be significantly corrected.

Further, the input of a correction amount is performed at regular intervals. That is, as the number of workpieces W machined by the tool T3 is increased, the cutting edge T30 of the tool T3 is worn out. Furthermore, the position of the cutting edge T30 is changed due to heat in addition to wear. Specifically, the workpiece W is mounted on the headstock 6. Meanwhile, the tool T3 is mounted on the tool rest 4. The headstock 6 generates heat due to the driving heat and the like of the spindle motor 63C shown in FIG. 4. Likewise, the tool rest 4 generates heat due to the driving heat and the like of the X-axis motor 45X and the Z-axis motor 45Z shown in FIG. 4. For this reason, as the tool rest 4 and the headstock 6 are thermally deformed, the relative positional relationship between the workpiece W and the cutting edge T30 of the tool T3 is changed. Accordingly, the position of the cutting edge T30 needs to be corrected at regular intervals. Moreover, the ambient temperature in a factory where the CNC lathe 1 is placed is changed due to the outdoor temperature (weather, season, or the like), the number of persons in the factory, the driving heat of machines disposed in the factory, and the like. The relative positional relationship between the workpiece W and the cutting edge T30 of the tool T3 is changed even due to the change of the ambient temperature. Accordingly, the position of the cutting edge T30 needs to be corrected at regular intervals.

For the purpose of the regular correction, a worker measures the dimensions of the workpiece W, which has been subjected to machining, at a predetermined timing (a predetermined number of machined workpieces W, a predetermined time, or the like) using calipers, micrometers, and the like. Further, a worker calculates an error between the measured dimension and the dimension of an ideal workpiece W. A worker inputs a correction amount according to the error.

Method of Inputting Correction Amount of Position of Cutting Edge of Tool

Next, a method of inputting a correction amount of the position of the cutting edge of the tool, which is performed at each timing, will be described. First, a worker presses the data display mode screen-switching button 812 of the maintenance screen 81 shown in FIG. 6. The calculation unit 21 shown in FIG. 4 switches the maintenance screen 81 to the data display mode screen 83 shown in FIG. 7.

Next, a worker makes the correction number display portion 830 display a correction number, which is an input object of a correction amount, by using the pair of correction number selection buttons 831. Meanwhile, the correction number of the correction number display portion 820 of the graph display mode screen 82 to be described below is changed in conjunction with the correction number of the correction number display portion 830. Likewise, even when a worker changes a correction number of the correction number display portion 820, the correction number of the correction number display portion 830 is changed in conjunction with the correction number of the correction number display portion 820.

When the correction number is displayed in the correction number display portion 830, the calculation unit 21 shown in FIG. 4 displays data groups, which are displayed on the ten horizontal lines, corresponding to the correction number (the X-axis correction amount display portion 833X, the Z-axis correction amount display portion 833Z, the current value display portion 834, and the record date-and-time display portion 835) for the respective correction history selection buttons 832. Meanwhile, these data groups are stored in the storage unit 20 when each correction amount is input. A worker can determine a correction amount, which is to be input at this time, with reference to the data groups that are displayed on the ten horizontal lines.

After that, a worker inputs a desired correction amount by the input buttons 85 shown in FIG. 1. The calculation unit 21 shown in FIG. 4 stores the correction amount in the storage unit 20, in association with the correction number (that is, a tool), the number of machined workpieces, and time. Further, the calculation unit 21 displays the correction amount on the data display mode screen 83 together with the number of machined workpieces and time.

Specifically, the latest data (a correction amount in the X-axis direction, a correction amount in the Z-axis direction, and the number of machined workpieces, and time) are displayed on the side of the correction history selection button 832 of the uppermost horizontal line of the data display mode screen 83. Meanwhile, old data are shifted by one line downwardly. Data, which are positioned on the side of the correction history selection button 832 corresponding to the lowermost horizontal line ("10" in this embodiment), disappear from the data display mode screen 83. However, the data remains in the storage unit 20. The controller 2 adjust the driving amounts of the X-axis motor 45X and the Z-axis motor 45Z, which are shown in FIG. 4, according to the input correction amount. That is, the position of the cutting edge T30 of the tool T3 is corrected.

Here, when inputting a correction amount, a worker, who has a certain level of skill, may want to refer to the change of a correction amount in the past. In this case, a worker presses the graph display mode screen-switching button 838 of the data display mode screen 83 shown in FIG. 7. The calculation unit 21 shown in FIG. 4 switches the data display mode screen 83 to the graph display mode screen 82 shown in FIG. 8.

As shown in FIG. 8, the same correction number as the correction number of the correction number display portion 830 of FIG. 7 is displayed in the correction number display portion 820 of the graph display mode screen 82. Further, a machining-based graph G1X corresponding to the correction number is displayed on the graph display mode screen 82.

A worker can zoom in and out the machining-based graph G1X in the vertical and horizontal directions by using the vertical axis zoom-in button 826*a*, the vertical axis zoom-out button 826*b*, the horizontal axis zoom-in button 827*a*, and the horizontal axis zoom-out button 827*b*. Further, a worker can zoom in and out and shift the machining-based graph G1X by directly touching the machining-based graph G1X itself with fingers. Furthermore, a worker can return the machining-based graph G1X to the reference position, which is shown in FIG. 8, by pressing the default button 822. Moreover, a worker can return the machining-based graph G1X to the reference scale shown in FIG. 8.

Further, a worker can display the time-based graph G2X, which is shown in FIG. 9, by pressing the time-based graph selection button 822*b*. Furthermore, a worker can display the machining-based graph G1Z, which corresponds to the Z axis, by pressing the Z-axis selection button 825Z. Meanwhile, a worker can display the time-based graph G2Z, which corresponds to the Z axis, (see FIG. 5) by pressing the Z-axis selection button 825Z when the time-based graph G2X shown in FIG. 9 is displayed.

For example, when a worker wants to refer to the change of a correction amount in the X-axis direction that is to be obtained after the replacement of a tool, a worker may display the machining-based graph G1X shown in FIG. 8. Further, when a worker wants to refer to the change of a correction amount in the X-axis direction that is to be obtained after the machine tool stops for a long time, a worker may display the time-based graph G2X shown in FIG. 9.

As described above, a worker can freely switch a total of four graphs shown in FIG. 5 (the machining-based graph G1X corresponding to the X-axis direction, the time-based graph G2X corresponding to the X-axis direction, the machining-based graph G1Z corresponding to the Z-axis direction, and the time-based graph G2Z corresponding to the Z-axis direction) according to one's own need and can estimate a correction amount that is to be input next time.

Among the above-mentioned timings of the input of a correction amount, when inputting a correction amount at regular intervals, a worker can determine a correction amount with a certain estimation by measuring the dimensions of a workpiece W. Further, when inputting a correction amount after the replacement of a tool, a worker can determine a correction amount with a certain estimation by referring to the correction amount that has been previously inputted after the replacement of a tool. Furthermore, when inputting a correction amount after the machine tool stops for a long time, a worker can determine a correction amount with a certain estimation by referring to the latest correction amount that has been inputted in the past (for example, at the same time yesterday). As described above, regardless of the level of skill of a worker, a worker can determine an adequate correction amount by using the four graphs.

Method of Selecting Correction Number that is Monitoring Object

Next, a method of selecting a correction number that is a monitoring object will be described. When all correction numbers corresponding to an X axis and a Z axis (that is, all tools T1 to T10) are set as monitoring objects (objects to be recorded), a large amount of data needs to be stored in the storage unit 20 shown in FIG. 4. Further, the correction numbers corresponding to tools T1 to T10 for finishing need to be intensively monitored as compared to the correction numbers corresponding to tools T1 to T10 for rough machining. For this reason, it is possible to select correction numbers when the memory of the storage unit 20 is small or a memory is to be saved.

First, an administrator inputs a password by using the input buttons 85 shown in FIG. 1 while the maintenance screen 81 shown in FIG. 6 is displayed. The calculation unit 21 shown in FIG. 4 displays the password in the password display portion 810 shown in FIG. 6.

Only when the displayed password is the same as the password that is stored in the storage unit 20 in advance, a correction number can be selected. That is, a correction number, which is a monitoring object, can be selected on the setting screen 84 shown in FIG. 10. Meanwhile, when a correction number can not be selected, the calculation unit 21 shown in FIG. 4 displays letters of "inoperable" in a portion that is surrounded in a rectangular shape by a one-dot chain line.

Next, the administrator inputs a correction number, which is to be monitored, by using the input buttons 85 shown in FIG. 1 while the setting screen 84 shown in FIG. 10 is displayed. The calculation unit 21 shown in FIG. 4 displays the correction number in the monitoring object candidate display portion 840*a* shown in FIG. 10. If the correction number displayed in the monitoring object candidate display portion 840*a* is the same as a correction number to be monitored, the administrator presses the monitoring object registration button 840*b*. That is, the administrator registers the correction number. When the correction number is registered, the calculation unit 21 shown in FIG. 4 selects only the data corresponding to the correction number (the correction amount, the number of machined workpieces, time, and the like) and stores the selected data in the storage unit 20. Further, the calculation unit 21 forms the monitoring object selection button 840*d* corresponding to the correction number. Furthermore, the calculation unit 21 selects only the data corresponding to the correction number, of which the monitoring object selection button 840*d* has been formed, (the correction amount, the number of machined workpieces, time, and the like) and makes the selected data be capable of being displayed on the screen 80 (the data display mode screen 83 and the graph display mode screen 82). Specifically, the calculation unit 21 makes only the correction number be capable of being displayed in the correction number display portion 830 shown in FIG. 7 and the correction number display portion 820 shown in FIG. 8 and FIG. 9.

Meanwhile, when wanting to exclude an arbitrary correction number from the monitoring object, the administrator presses the monitoring object selection button 840*d* corresponding to a desired correction number. The calculation unit 21 shown in FIG. 4 displays the correction number in the monitoring object candidate display portion 840*a* shown in FIG. 10. If the correction number displayed in the monitoring object candidate display portion 840*a* is the same as a correction number to be excluded, the administrator presses the monitoring object deletion button 840*c*. That is, the administrator unregisters the correction number. The calculation unit 21 shown in FIG. 4 deletes the data corresponding to the correction number (the correction amount, the number of machined workpieces, time, and the like) from the storage unit 20.

Method of Deleting Correction Amount

Next, a method of deleting a correction amount, which has been input, by a worker will be described. The correction amount, which is input once, remains in the storage unit 20 for the investigation of a cause of the occurrence of a defective product. However, there is a case where a worker wants to delete a correction amount, such as a case where a correction amount is input by way of a trial. It is possible to delete a correction amount to cope with this case.

A worker inputs a password by using the input buttons 85 shown in FIG. 1 while the maintenance screen 81 shown in FIG. 6 is displayed. The calculation unit 21 shown in FIG. 4 displays the password in the password display portion 810 shown in FIG. 6.

Only when the displayed password is the same as a password that is stored in the storage unit 20 in advance, a correction number can be deleted. That is, it is possible to delete the correction amount that is input once on the data display mode screen 83 shown in FIG. 7.

When the password is input, the individual-data deletion button 836*a* and the all-data deletion button 836*b* are displayed on the data display mode screen 83 shown in FIG. 7.

In order to delete a correction amount corresponding to only one horizontal line, a worker presses the desired correction history selection button 832 first. Then, a worker presses the individual-data deletion button 836*a*. The calculation unit 21 shown in FIG. 4 deletes the data displayed on only one horizontal line (a numerical value of the X-axis correction amount display portion 833X, a numerical value of the Z-axis correction amount display portion 833Z, a numerical value of the current value display portion 834, and a numerical value of the record date-and-time display portion 835) from the storage unit 20.

In order to delete correction amounts corresponding to a plurality of horizontal lines in one lump, a worker presses the plurality of desired correction history selection buttons 832 first. Then, a worker presses the all-data deletion button 836*b*. The calculation unit 21 shown in FIG. 4 deletes the data, which are displayed on the plurality of horizontal lines corresponding to the plurality of selected correction history selection buttons 832, (numerical values of the X-axis correction amount display portions 833X, numerical values of the Z-axis correction amount display portions 833Z, numerical values of the current value display portions 834, and numerical values of the record date-and-time display portions 835) from the storage unit 20.

Meanwhile, if there are data older than the deleted data, the data are moved up and displayed. For example, when the data, which are displayed on the second horizontal line from below (where the correction history selection button 832 corresponds to "9") are deleted, the data displayed on the lowermost horizontal line (where the correction history selection button 832 corresponds to "10") are moved up. Further, older data are newly displayed in the empty lowermost horizontal line. Furthermore, when data are deleted, the number of data, which can be stored in the data quantity display portion 841 of FIG. 10 is recovered.

Functional Effects

Next, functional effects of the CNC lathe 1 of this embodiment will be described. According to the CNC lathe 1 of this embodiment, as shown in FIG. 9, it is possible to display the change of a correction amount as a graph in association with not elapsed time but time. For this reason, a worker easily grasps the change of a correction amount that is caused by the influence of heat.

Further, according to the CNC lathe 1 of this embodiment, as shown in FIG. 9, a worker can confirm correction amounts, which are input in the past by a worker, by seeing the time-based graph G2X. For this reason, a worker can inspect an input correction amount afterward.

Furthermore, according to the CNC lathe 1 of this embodiment, a worker easily determines the tendency of the change of a correction amount corresponding to the operation hours, the on-duty hours, season, and the like by analyzing the correction history of the past. For this reason, a worker easily determines an adequate correction amount regardless of the level of skill of a worker.

Moreover, as described above, the relative positional relationship between the workpiece W and the cutting edge T30 of the tool T3, that is, the position of the cutting edge of the tool T3 is changed due to the heat generated by the headstock 6 and the tool rest 4. In particular, as shown in FIG. 9, the temperatures of the tool rest 4 and the headstock 6 tend to be lowered after the machine tool stops for a long time, such as at the time of the start of work, after a meal, a recess, and the like. For this reason, a worker needs to input a large correction amount. In this respect, according to the CNC lathe 1 of this embodiment, it is possible to display the change of a correction amount as a graph in association with time. For this reason, a worker can input a correction amount with reference to the latest correction amounts that has been inputted in the past (for example, at the same time yesterday). Accordingly, a worker easily determines an adequate correction amount regardless of the level of skill of a worker.

Further, the calculation unit 21 shown in FIG. 4 displays the individual-data deletion button 836*a* and the all-data deletion button 836*b* on the data display mode screen 83 shown in FIG. 7 only when a correct password is input to the password display portion 810 shown in FIG. 6. That is, if a correct password is not input, the calculation unit 21 does not allow the deletion or update of a correction amount. For this reason, when a worker incorrectly inputs a correction amount, it is possible to regulate the deletion of the input history of the correction amount. Accordingly, when the occurrence of defective products is caused by the incorrect input of a correction amount, it is easy to investigate the cause of the occurrence of defective products.

Furthermore, the selection portion 840 is disposed on the setting screen 84 shown in FIG. 10. Only correction history data associated with a correction number selected by a worker are stored in the storage unit 20 shown in FIG. 4. For this reason, it is possible to save the memory of the storage unit 20 as compared to a case where correction history data corresponding to all correction numbers are stored in the storage unit 20.

Moreover, according to the CNC lathe 1 of this embodiment, it is possible to switch and display the machining-based graphs G1X and G1Z and the time-based graphs G2X and G2Z for each correction number. For this reason, a worker can select the time-based graphs G2X and G2Z when wanting to see the change of a correction amount corresponding to the thermal displacement, and a worker can select the machining-based graphs G1X and G1Z when wanting to see the change of a correction amount corresponding to the wear of the tools T1 to T10.

Further, according to the CNC lathe 1 of this embodiment, it is possible to switch and display the machining-based graph G1Z and the time-based graph G2Z corresponding to the Z-axis direction and the machining-based graph G1X and the time-based graph G2X corresponding to the X-axis direction. For this reason, it is possible to manage a correction amount for each of the Z-axis direction (the spindle direction) and the X-axis direction (the orthogonal direction).

Furthermore, according to the CNC lathe 1 of this embodiment, it is possible to switch and display the graph display mode screen 82 and the data display mode screen 83. For this reason, it is possible to visually recognize not only the change of a correction amount but also a specific correction amount (an input value).

Others

The embodiment of the CNC lathe 1 of the invention has been described above. However, an embodiment is not particularly limited to the above-mentioned embodiment. The invention may be embodied as various modifications and improvements that can be made by those skilled in the art.

The destination of the data of the storage unit 20 shown in FIG. 4 is not limited to a CF card. The destination of the data of the storage unit 20 may be a storage medium such as an optical disc, a magnetic disc, a magnetic optical disc, and a flash memory. Further, only any one of an X-axis correction amount and a Z-axis correction amount may be stored in the storage unit 20 shown in FIG. 4. Furthermore, only any one of an X-axis correction amount and a Z-axis correction amount may be displayed on the graph display mode screen 82 shown in FIGS. 8 and 9 and the data display mode screen 83 shown in FIG. 7. That is, there are many cases where the correction amounts of tools T1 to T10 for cutting the outer peripheral surface or the inner peripheral surface of a workpiece W having minor axis (for example, a ring-shaped workpiece), which are displayed in the Z-axis correction amount display portions 833Z, and the correction amounts of tools T1 to T10 for cutting the end surface of the workpiece in the axis direction, which are displayed in the X-axis correction amount display portions 833X, are not changed substantially. For this reason, the storage or display of these correction amounts may be omitted. Meanwhile, the X-axis correction amount and the Z-axis correction amount of a workpiece W having a major shaft (for example, a camshaft) need to be stored and displayed together.

Moreover, when the change ratio of a correction amount is suddenly changed (for example, an absolute value (h1−h2) of a difference between a correction amount h1 that is input at the Nth time (N is a natural number equal to or larger than 2) and a correction amount h2 that is input at the N−1th time is significantly larger than an absolute value (h2−h3) of a difference between a correction amount h2 and a correction amount h3 that is input at the N−2th time), the calculation unit 21 shown in FIG. 4 may display an alarm on the data display mode screen 83 shown in FIG. 7. Accordingly, it is possible to prevent the simple incorrect input, such as the shift of a point or a different number digit.

Further, the machining-based graph G1X and the time-based graph G2X may be disposed side by side on the graph display mode screen 82. Likewise, the machining-based graph G1Z and the time-based graph G2Z may be disposed side by side on the graph display mode screen 82. Furthermore, the machining-based graph G1X, the time-based graph G2X, the machining-based graph G1Z, and the time-based graph G2Z may be disposed side by side on the graph display mode screen 82.

Moreover, a numerical value "131" of the current value display portion 834 displayed on the side of the correction history selection button 832 of the uppermost horizontal line of the data display mode screen 83 shown in FIG. 7 means that a workpiece W machined immediately after a correction amount "0.110" in the X-axis direction is input is the 131st workpiece. That is, this does not mean the number of machined workpieces at the present time. For this reason, the number of machined workpieces at the present time may be displayed on the data display mode screen 83. Accordingly, it is possible to visually recognize the number of workpieces machined after the input of the latest correction amount. Likewise, the number of machined workpieces W at the present time may be represented on the horizontal axis of the machining-based graph G1X shown in FIG. 8. Further, the current time may be represented on the horizontal axis of the time-based graph G2X shown in FIG. 9.

Further, the default position corresponding to the default button 822 shown in FIGS. 8 and 9 is not particularly limited. The machining-based graph G1X and the time-based graph G2X at the time of the first input of a correction amount may be used as the default position. Furthermore, the machining-based graph G1X and the time-based graph G2X at the time of the latest input of a correction amount may be used as the default position.

Moreover, the setting screen 84 shown in FIG. 10 may not be provided. That is, if there is a space in the memory of the storage unit 20, a correction number as a monitoring object is not particularly selected and all the correction numbers may be used as monitoring objects.

Further, the correction amount shown in FIGS. 7 to 9 may not be a cumulative correction amount (an absolute correction amount with respect to the reference position "0"). That is, the correction amounts shown in FIGS. 7 to 9 may be a correction amount relative to the previous correction amount. As an example, a cumulative correction amount of "0.110" may not be displayed and a variation ("0.006") of a correction amount ("0.105") of the X-axis correction amount display portion 833X, which is displayed on the second horizontal line from above, may be displayed in the X-axis correction amount display portion 833X that is displayed on the uppermost horizontal line shown in FIG. 7. The correction amounts of the other X-axis correction amount display portion 833X and the other Z-axis correction amount display portion 833Z are the same as described above. Likewise, a correction amount, which is input by a worker, may be a cumulative correction amount ("0.110" in the above-mentioned embodiment) and may be a relative correction amount ("0.006" in the above-mentioned embodiment). Moreover, a worker may input a relative correction amount ("0.006" in the above-mentioned embodiment) and the screen may display a cumulative correction amount ("0.110" in the above-mentioned embodiment).

The spindle direction of the CNC lathe 1 is not particularly limited. That is, the machine tool of the invention may be embodied as a horizontal lathe, a face lathe, or a vertical lathe. Further, the machine tool of the invention may be embodied as a milling machine, a drilling machine, or a milling cell.

What is claimed is:
1. A machine tool comprising:
   a controller including a storage unit configured to store correction history data including correction amounts of the positions of tools input to the storage unit and time of day when the correction amounts are input, in associa- tion with the tools, the correction history data including the number of machined workpieces at the time of the input of the correction amount;

a display device configured to display a time-based graph showing a relationship between the time of day and the correction amount for each tool, where the time of day is shown as the hour of day, the display device being configured to switch and display the time-based graph and a machining-based graph showing a relationship between the number of machined workpieces and the correction amount for each tool, wherein when a direction where a spindle extends is defined as a spindle direction and a direction orthogonal to the spindle direction is defined as an orthogonal direction, the display device displays and switches the time-based graph and the machining-based graph for each of the spindle direction and the orthogonal direction; and a driving device configured to adjust the position of each tool, the controller being configured to adjust a driving amount of the driving device in order to adjust the position of each tool based on a current correction amount input to the storage unit.

2. The machine tool according to claim 1, wherein the display device displays and switches a graph display mode screen that displays the time-based graph for each tool and a data display mode screen that displays the correction history data for each tool.

* * * * *